United States Patent

Dobreski et al.

Patent Number: 5,334,428
Date of Patent: Aug. 2, 1994

[54] MULTILAYER COEXTRUDED LINEAR LOW DENSITY POLYETHYLENE STRETCH WRAP FILMS

[75] Inventors: David V. Dobreski; George N. Eichbauer, both of Fairport; Michael E. Leach, Penfield, all of N.Y.

[73] Assignee: Mobil Oil Corporation, Fairfax, Va.

[21] Appl. No.: 997,411

[22] Filed: Dec. 28, 1992

[51] Int. Cl.⁵ .......................... B65D 65/02
[52] U.S. Cl. .................... 428/34.9; 428/218; 428/349; 428/516; 428/523; 156/244.11
[58] Field of Search ............ 428/349, 516, 523, 34.9, 428/218; 156/244.11

[56] References Cited

U.S. PATENT DOCUMENTS

| | | | |
|---|---|---|---|
| 4,011,382 | 3/1977 | Levine et al. | 526/96 |
| 4,311,808 | 1/1982 | Su | 525/222 |
| 4,364,981 | 12/1982 | Horner et al. | 428/35 |
| 4,367,256 | 1/1983 | Biel | 428/218 |
| 4,399,173 | 8/1983 | Anthony et al. | 428/35 |
| 4,399,180 | 8/1983 | Briggs et al. | 428/212 |
| 4,418,114 | 11/1983 | Briggs | 428/218 |
| 4,511,609 | 4/1985 | Craver et al. | 428/35 |
| 4,518,654 | 5/1985 | Eichbauer et al. | 428/331 |
| 4,565,720 | 1/1986 | Yaeo et al. | 428/35 |
| 4,574,104 | 3/1986 | Aishima et al. | 428/220 |
| 4,657,811 | 4/1987 | Boyd et al. | 428/318.6 |
| 4,820,589 | 4/1989 | Dobreski et al. | 428/422 |
| 4,963,388 | 10/1990 | Benoit | 427/29 |
| 4,996,054 | 2/1992 | Pietsch et al. | 424/422 |
| 4,996,094 | 2/1992 | Dutt | 428/212 |
| 5,019,315 | 5/1991 | Wilson | 264/171 |
| 5,248,547 | 9/1993 | Wilson | 428/218 |

Primary Examiner—Edith Buffalow
Attorney, Agent, or Firm—Alexander J. McKillop; George W. Hager, Jr.; L. G. Wise

[57] ABSTRACT

The present invention relates to multilayer coextruded thermoplastic stretch wrap films useful for the packaging or palletizing of goods. More particularly the films of this invention comprise at least three layers having two outer layers and at least one intermediate layer placed between the outer layers. The intermediate layer includes a low melt index linear low density copolymer of ethylene and a minor amount of at least one alpha olefin having from 4 to 10 carbon atoms, the low melt index linear low density copolymer having a melt index of between about 0.5 to about 2.5. At least one of the two outer layers includes a high melt index linear low density copolymer of ethylene and a minor amount of at least one alpha olefin having from 4 to 10 carbon atoms, the high melt index linear low density copolymer having a melt index of greater than about 2.5, the high melt index linear low density copolymer containing from about 3.5 to about 15 weight percent n-hexane extractibles. The n-hexane extractibles are present in an amount sufficient to cause the stretch wrap film to exert a cling force to itself or other surfaces when used in the stretch overwrap packaging of articles.

24 Claims, No Drawings

MULTILAYER COEXTRUDED LINEAR LOW DENSITY POLYETHYLENE STRETCH WRAP FILMS

FIELD OF THE INVENTION

The present invention is directed to stretch wrap polyolefinic films and a method for their production. In particular, the invention is concerned with a three layer coextruded film having an intermediate layer of low melt index linear low density polyethylene for strength and two outer layers of high melt index linear low density polyethylene. The films of this invention are particularly useful for the wrapping of palletized loads.

BACKGROUND OF THE INVENTION

The use of thermoplastic stretch wrap films for the overwrap packaging of goods, and in particular, the unitizing of palleted loads, is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods. Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a stretch wrap film often include: good cling or cohesion properties, good transparency or opacity, low stress relaxation with time, high resistance to transverse tear when under machine direction tension, producible in thin gauges, low specific gravity, good tensile toughness, high machine direction ultimate tensile strength, high machine direction ultimate elongation, high modulus of elasticity and high puncture resistance.

Physical properties which are particularly significant for the successful use of thermoplastic films in stretch wrap applications include their puncture resistance, their elongation characteristics, their toughness, and their resistance to tearing while under tension. In general, tensile toughness is measured as an area under a stress-strain curve developed for a thermoplastic film, and it may be considered as the tensile energy absorbed, expressed in units of ft.-lbs./cu.in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to unstretched counterparts, including such materials as shrink wrap. Generally this loss of toughness is proportional to the amount of stretch imparted to the film as it is overwrapping a load of goods.

As hereinabove indicated, the resistance to tear characteristic of such films will obviously be an important physical characteristic for stretch wrap applications since if the edge of the stretch film roll is nicked, abraded or in any way weakened before stretching or during the stretching operation, premature tearing of the film will usually occur during wrapping or subsequent handling of the load of goods.

Some resins which have been used in the fabrication of stretch wrap film are polyethylene, polyvinylchloride and ethylene vinyl acetate. A fairly recent development has been the utilization of linear low density polyethylene (LLDPE) in the manufacture of stretch wrap film, e.g., as described in U.S. Pat. Nos. 4,399,180, 4,418,114 and 4,518,654, the contents of which are incorporated by reference herein. The excellent toughness and puncture resistance properties of LLDPE makes it an excellent resin for such an application. LLDPE and methods for its manufacture are described in, among others, U.S. Pat. Nos. 3,645,992, 4,076,698, 4,011,382, 4,163,831, 4,205,021, 4,302,565, 4,302,566, 4,359,561 and 4,522,987. In general, films fabricated from the typical LLDPE resins of commerce possess little or no cling property on either surface thereof in the absence of added cling agent. LLDPE films possessing an inherent cling property wherein the LLDPE possesses a relatively high level of n-hexane extractables are disclosed in U.S. Pat. No. 5,273,809, Application Serial No. 07/985,042, having an issue date of Dec. 28, 1993. U.S. Pat. No. 5,273,809 is a divisional of Application Serial No. 07/903,295. filed on Jun. 24, 1992, which is a continuation-in-part of Application Serial No. 07/296,930, filed on Jan. 12, 1989, which is a continuation of Application Serial No. 07/039,892, filed on Apr. 17, 1987, the contents of each of which are incorporated by reference in their entirety.

Other thermoplastic films are known in the art. U.S. Pat. No. 4,311,808 describes a cling film containing a homogeneous mixture of polyisobutylene, ethylenepropylene and a low density polyethylene.

Another multilayer composite film is found in U.S. Pat. No. 4,364,981 in which a core or intermediate layer of low pressure low density polyethylene (LPLDPE) and skin layers of high pressure low density polyethylene (HPLDPE) are taught. The LPLDPE described within U.S. Pat. No. 4,364,981 is actually an LLDPE, as may be seen by reference to the process for making LLDPE of U.S. Pat. No. 4,011,382 disclosed at column 1, lines 52–55. The films disclosed are said to be useful in forming bags such as trash bags. No disclosure of possible utility as a stretch wrap is found within this patent.

U.S. Pat. No. 4,367,256 describes a cling wrap plastic film based on a blend of high pressure low density polyethylene (HPLDPE) and LLDPE in which the latter resin represents from 5-16 weight percent of the total. In one embodiment, this film is sandwiched between two HPLDPE films.

U.S. Pat. No. 4,399,173 describes a multilayer plastic film suitable for use in packaging and in the forming of refuse bags, which is said to be free of melt fracture. The film disclosed therein includes a core layer of low melt index, low pressure, low density polyethylene and two outer layers of a high melt index, low pressure, low density polyethylene. It is disclosed that the preferred method of forming the films of U.S. Pat. No. 4,399,173 is by tubular blown film extrusion.

U.S. Pat. Nos. 4,399,180 and 4,418,114 describe a coextruded composite stretch wrap film in which an LLDPE core layer is surfaced with HPLDPE skin layers.

U.S. Pat. No. 4,511,609 discloses a multilayer film for use in the manufacture of garbage bags wherein the film comprises a first outer layer of LLDPE, a second outer layer of HPLDPE and a intermediate layer also of HPLDPE or a blend of LLDPE and HPLDPE. No statement as to whether the films disclosed have any possible utility as stretch wraps is made within this patent.

In the one-sided cling stretch wrap film of U.S. Pat. No. 4,518,654, layer A of the disclosed A/B structure is fabricated from a resin possessing an inherent cling property and/or a cling property resulting from the incorporation of a cling additive therein. Layer A is coextruded with layer B, which is fabricated from a resin exhibiting little if any cling. Layer B further exhibits a slide property when in contact with a layer of itself with relative motion therebetween. Layer B can contain an anti-cling additive at a level of from about 0.05 to about 2.0 weight percent of the resin component of the layer, and can consist of such materials as crystalline and amorphous silicate. In each of the two working examples of this patent, layer A is an LLDPE film containing a cling additive, namely, polyisobutylene, with synthetic sodium silicate particles being uniformly incorporated throughout layer B of the film of Example 1 and amorphous silica particles being uniformly incorporated throughout layer B of the film of Example 2. Layer B, the layer providing the noncling surface of the films of Examples 1 and 2 is HPLDPE. Improved one-sided cling/one-sided slip stretch wrap films are disclosed in U.S. Pat. No. 4,996,054.

U.S. Pat. No. 4,565,720 discloses three layer packaging bags in which an intermediate layer comprising a mixture of LLDPE and high density polyethylene (HDPE) is taught. Outer layers of the bags are made of HPLDPE or a mixture of HPLDPE and an ethylene-vinyl acetate copolymer. The structures disclosed are not cited as being useful in forming stretch wrap films.

A multilayer film in which the intermediate layer comprises LLDPE and HDPE and the outer layers comprise an LLDPE and at least one such outer layer further comprises an HPLDPE is disclosed in U.S. Pat. No. 4,574,104. One film disclosed therein is a three-layer structure in which the intermediate layer comprises LLDPE, HPLDPE and HDPE. Packaging bags are the chief utility cited for these multilayer films. No disclosure of utility as a stretch wrap is made.

In U.S. Pat. No. 4,657,811, a three-layer plastic film suitable for use in trash bag manufacturing is disclosed wherein an intermediate layer of foamed HPLDPE is disposed between outer layers of LLDPE. Again, the films disclosed are not cited as finding utility as stretch wrap films.

U.S. Pat. No. 4,996,094 discloses a stretch wrap polyolefinic film having one surface with cling properties and the other surface having noncling or slip properties. A high molecular weight cling additive is employed to reduce additive migration and transfer from the cling surface of the film.

U.S. Pat. No. 5,019,315 discloses multilayer coextruded thermoplastic stretch wrap films useful for the packaging or palletizing of goods. The films disclosed include at least three layers having two outer layers and at least one intermediate layer placed between the outer layers. The intermediate layer is formed from a high pressure low density polyethylene resin and the outer layers are formed from a linear low density polyethylene copolymer such as ethylene copolymerized with a minor amount of at least one $C_4$ to $C_{10}$ alpha-olefin, such as hexene-1, octene-1, decene-1, 4-methyl-pentene-1 and butene-1. The force required to stretch the film may be controlled by the thickness of the intermediate layer relative to overall film thickness, the melt index of the intermediate layer resin, the molecular weight of the intermediate layer resin or a combination thereof.

As previously indicated, methods of stretch wrapping articles, containers, etc., are known. U.S. Pat. No. 3,986,611 describes a tension-wrapped palletized load obtained with a stretch wrap film possessing a cling additive.

U.S. Pat. No. 4,079,565 describes a stretch-wrapped package, process and apparatus which employs a stretch wrap polyethylene film.

U.S. Pat. No. 4,409,776 discloses a method and apparatus for packaging articles with a composite stretch wrap film, one surface of which is nonadhesive. The adhesive surface is obtained with an "adhesive film" such as one fabricated from ethylene-vinyl acetate copolymer, 1,2-polybutadiene or styrenebutadiene copolymer and the nonadhesive surface is obtained with a "nonadhesive film" such as one fabricated from a crystalline polyolefin, e.g., polyethylene, polypropylene or ethylene-propylene copolymer.

While it is apparent that a wide variety of stretch wrap films have been disclosed for use in packaging or palletizing operations, virtually all suffer from one or more notable deficiencies. Not all films known in the art Dossess good on-load stretched cling properties. Other films are deficient in their tensile properties, including the force required in the machine direction (MD) to stretch the film. Still, not all end use applications require the same film characteristics, necessitating the complex production of a broad range of films to suit these applications.

It is therefore an object of the present invention to provide a novel multilayered coextruded film which exhibits aood stretched cling and good machine direction stretch properties so as to provide utility in industrial pallet wrapping applications.

It is another object of the present invention to provide a novel multilayered coextruded stretch wrap film having good cling properties and high machine direction load force.

It is another object of the present invention to provide a multilayered coextruded stretch wrap film having high puncture and tear resistance.

It is another object of the present invention to provide a multilayered coextruded stretch wrap film having high resistance to tear when stretched in the transverse direction.

It is yet another object of the present invention to provide a process for the production of the novel films of this invention.

It is yet a further object to overcome the aforementioned problems in an effective and economical manner.

Other objects of the invention include the use of a stretch wrap film of the aforementioned characteristics in the overwrapping of a plurality of goods to provide a unitized packaged unit.

Further objects of this invention will become apparent from a reading of the specification and appended claims.

SUMMARY OF THE INVENTION

In accordance with the present invention a thermoplastic stretch wrap film is provided which comprises at least three layers, the three layers having two outer layers and an intermediate layer positioned between the outer layers. The intermediate layer includes a low melt index linear low density copolymer of ethylene and a minor amount of at least one alpha olefin having from 4 to 10 carbon atoms, the melt index of the low melt index linear low density copolymer being between about 0.5 to about 2.5. At least one of the two outer layers is to include a high melt index linear low density copolymer of ethylene and a minor amount of at least one alpha olefin having from 4 to 10 carbon atoms, the melt index of the high melt index linear low density copolymer being greater than about 2.5. The high melt index linear low density copolymer of the present invention also contains, as is preferred, from about 3.5 to about 15 weight percent n-hexane extractibles, wherein the n-hexane extractibles are present in an amount sufficient to cause the stretch wrap film to exert a cling force to itself or other surfaces when used in the stretch overwrap packaging of articles. In a preferred embodiment, the linear low density polyethylene resin used to produce the outer layers comprises ethylene copolymerized with a minor amount of an alpha olefin having 6 carbon atoms.

According to another aspect of the invention, there is provided a method for preparing the films of this invention. The method includes the step of coextruding a film having at least three layers, the three layers having two outer layers and an intermediate layer positioned between the outer layers, the intermediate layer comprising a low melt index linear low density copolymer of ethylene and a minor amount of at least one alpha olefin having from 4 to 10 carbon atoms, the low melt index linear low density copolymer having a melt index of between about 0.5 to about 2.5, and at least one of the two outer layers comprising a high melt index linear low density copolymer of ethylene and a minor amount of at least one alpha olefin having from 4 to 10 carbon atoms, the high melt index linear low density copolymer having a melt index of greater than about 2.5, the high melt index linear low density copolymer containing from about 3.5 to about 15 weight percent n-hexane extractibles, wherein the n-hexane extractibles are present in an amount sufficient to cause the stretch wrap film so coextruded to exert a cling force when in surface-to-surface contact with itself or another surface when used in the stretch overwrap packaging of articles.

DETAILED DESCRIPTION OF THE INVENTION

The present invention comprises the formation of a laminar stretch wrap thermoplastic film by initially preparing the coextruded stretch wrap product utilizing conventional coextrusion techniques. The material construction of the laminate prepared in accordance with the present invention comprises an intermediate layer of a linear low density polyethylene resin (LLDPE) of low melt index produced by a low pressure process wherein a major proportion by weight of ethylene is copolymerized with a minor proportion by weight of an alpha olefin monomer containing 4 to 10 carbon atoms. The low melt index linear low density polyethylene intermediate layer provides the requisite strength and toughness properties necessary stretch film applications. By the use of the term low melt index linear low density polyethylene is meant an LLDPE resin having a melt index of less than about 2.5, as determined using the industry recognized standard test method, ASTM 1238 (Standard Test Method for Flow Rates of Thermoplastics by Extrusion Plastometer).

The low melt index LLDPE resins for use as the intermediate layer of the films of this invention have a density ranging from about 0.890 to about 0.940 gm/c.c. and a melt index of from about 0.2 to about 2.5. Particulary preferred are those LLDPE resins possessing densities within the range from about 0,915 to 0,920 gm/c.c. and melt indices within the range from about 1.0 to about 2.0. As will be demonstrated by the Examples which follow, from the standpoint of puncture resistance and resistance to tearing in the machine direction of the coextruded film, the use of ethylene-hexene-1 and ethylene-octene-1 LLDPE's are particularly preferred as intermediate layer resins in the practice of the present invention.

The resin employed to make the outer layers of the stretch wrap films of the present invention is, once again, a linear low density polyethylene resin wherein a major proportion by weight of ethylene is copolymerized with a minor proportion by weight of an alpha olefin monomer containing 4 to 10 carbon atoms. However, in accordance with the invention disclosed herein, the outer layer LLDPE resin is one having a high melt index. By the use of the term high melt index linear low density polyethylene is meant an LLDPE resin having a melt index of greater than about 2.5, again, as determined using the industry recognized standard test method, ASTM 1238 (Standard Test Method for Flow Rates of Thermoplastics by Extrusion Plastometer).

By the use of the term minor proportion by weight of an alpha olefin monomer is meant a proportion which does not exceed the proportion, by weight, of ethylene present in the copolymer, in other words, a proportion of alpha olefin monomer less than 50 weight percent. Preferably the ethylenic copolymers employed are those having from about 1 to about 20 weight percent of the higher alpha olefin monomer copolymerized therein. In addition, it is also preferred that the alpha olefin monomer employed in the ethylenic copolymer be selected from the group consisting of butene-1,3-methyl-butene-1,3-methyl-pentene-1,-hexene-1, 4-methyl-pentene-1, 3-methyl-hexene-1, octene-1 and decene-1. Preferred, particularly for use in the outer layers of the multilayer film structures of the present invention, are LLDPE resins formed using the hexene-1 alpha olefins, as will be described in more detail below. Particularly preferred resins for use in forming the intermediate layer of the multilayer film structures of the present invention are the ethylenic copolymers employing hexene-1 and octene-1 alpha olefins. These particularly preferred intermediate layer resins offer improved strength and puncture resistance to the multilayer structures of the present invention. The LLDPE resins are prepared at relatively low pressures employing coordination-type catalysts. Reference may be made to U.S. Patent Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

As discussed above. Application Serial No. 07/903,295, filed on Jun. 24, 199P, which is a continuation-in-part of Application Serial No. 07/296,630, filed on Jan. 12, 1989, which is a continuation of Application Serial No. 07/039,892, filed on Apr. 17,1987, disclosed the discovery that certain LLDPE resins can possess an inherent cling property in the absence of added cling agents. Those resins were found to possess a relatively high weight percentage of n-hexane extractables, as measured by the n-hexane extractables method of 21 C.F.R. 177.1520. Although it has not been confirmed that the n-hexane extractables are, in fact, the cause of the inherent cling property of the stretch wrap film disclosed in U.S. Serial No. 07/903,295, a correlation between cling and the level of such extractables was disclosed therein, lending support to the view that the extractables are indeed responsible for the cling behavior. Those LLDPE resins possessing a relatively high weight percentage of n-hexane extractables, are particularly preferred for use in forming at least one of the outer layers of the films of the present invention. As may be appreciated by those skilled in the art, depending upon the functionality desired of the particular film to be produced in accordance with the present invention, it will often be particularly preferred that both outer layers be produced from these LLDPE resins. Preferably, these LLDPE resins for use in the outer film layers will contain from about 3.5 to about 15 and, still more preferably, from about 4 to about 8, weight percent of n-hexane extractables. It should be noted that it has been discovered that a level of less than 3 wt. % n-hexane extractibles will not provide an acceptable level of cling for commercial purposes. The n-hexane extractables method of 21 C.F.R. 177.1520 is presented in Application Serial No. 07/903,295, the contents of which are hereby incorporated by reference for those details.

The level of n-hexane extractibles in the preferred films of this invention can also be expressed in terms of a specific cling force. A test procedure for use in measuring cling force in films is presented in Application Serial No. 07/903,295, filed on Jun. 24, 1992, the contents of which are hereby incorporated by reference for those details. Employing the test procedure of Application Serial No. 07/903,295, the n-hexane extractible component of the LLDPE film should be such as to provide a cling force of at least about 140 grams, preferably at least about 200 grams. Cling forces exceeding 200 grams, e.g., 300–400 grams, are also within the scope of this invention.

The high melt index LLDPE resins for use in the outer layers of the films of this invention have a density ranging from about 0,890 to about 0.940 gm/c.c. and a melt index of from about 2.5 to about 10. Particularly preferred are those LLDPE resins possessing densities within the range from about 0.915 to 0.920 gm/c.c. and melt indices within the range from about 2.8 to about 5.0.

The LLDPE resin can be blended or alloyed with minor amounts, e.g., up to about 50 weight percent total, of one or more other suitable resins to achieve a desired range of physical/mechanical properties in the film product. Thus, for example, such resins as EVA copolymer, HPLDPE and other LLDPE resins may be used for blending to obtain useful mixtures for forming the outer layers of the films of this invention.

The LLDPE resins which are useful herein can also contain known and conventional cling additives to augment the cling property which, at least in the case of the particularly preferred resins, is inherently exhibited. Examples of useful cling additives include polyisobutylenes having a number average molecular weight in the range of from about 1,000–3,000 grams per mole as measured by vapor phase osmometry, amorphous atactic polypropylenes, e.g., those having an average molecular weight of about 2000, polyterpenes and ethylene-vinyl acetate copolylmers containing from about 5-15 weight percent copolymerized vinyl acetate. As disclosed in U.S. Pat. No. 4,996,094, which is hereby incorporated by reference in its entirety, polyisobutylene having a number average molecular weight exceeding 2500 has been found to exhibit the unusual benefits of reduced additive migration and reduced surface transfer (pickoff). As such, these are the more preferred agents for use in this invention. The optional cling additive can be present in the outer layers in a concentration of from about 0.5 to about 10 pounds per 100 pounds of resin. Of course, other conventional film additives such as antioxidants, LFV stabilizers, pigments, dyes, etc., can be present in the usual amounts.

The multilayer film compositions of this invention have been found to provide good stretched cling and high machine direction force to stretch which are desirable features in industrial pallet wrapping applications.

The film thickness, of these multilayer films can vary widely and in general, can be a thickness which is typical for stretch wrap films. A total film thickness of from about 0.4 to about 2.5 mils, preferably from about 0.5 to about 1.5 mils, is suitable for most applications. In the case of multilayer films constructed in accordance with this invention, the outer layers together can represent from about 10 to about 95, and preferably from 20 to about 90, percent of the total gauge thickness with the intermediate layers representing the balance of the thickness.

In the multilayer films of this invention possessing a non-cling surface layer, the layer can contain an anti-cling additive and/or any other component which imparts a capability for relative movement between this layer and an adjacent layer of itself. This embodiment overcomes the problem, noted in U.S. Pat. No. 4,518,654, supra, of the tendency of a pallet load overwrapped with a stretch wrap film possessing cling on both of its major surfaces from destructively pulling away from a similarly overwrapped pallet load with which it is in contact when one of the pallet loads is moved relative to the other (as would be the case in the fork lift truck-handling of such overwrapped pallet loads stored in a warehouse). The anti-cling additive present in the non-cling exterior layer can be any of those previously known to be useful for this purpose, e.g., crystalline and amorphous silicas, a synthetic sodium aluminum silicate such as $Na_2O.Al_2O_3.SiO_2.4H_2O$, diatomaceous earth, talc, etc., having a particle size range of from about 0.5 to about 20 microns. The anti-cling agent can be present in a widely ranging amount, e.g., from about 500 to about 20,000 ppm. Other additives, e.g., any of those previously mentioned, as well as anti-blocking agents, coefficient of friction (COF) reducing agents, etc., can be present in the non-cling layer(s) of the multilayer film embodiment of this invention.

Either or both major surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use. Thus, the film herein can be capable of undergoing stretch from less than about 50 to about 500, and preferably from about 75 to about 400, linear percent during the overwrapping operation.

It is preferred to employ known and conventional techniques of coextrusion to assemble the composite structures of the films of this invention. Reference may be made to U.S. Patent No. 3,748,962, the contents of which are incorporated by reference herein, for details of a coextrusion procedure which can be employed in the fabrication of a multilayer film in accordance with this invention.

The pallet unitizing techniques described in U.S. Pat. Nos. 3,986,611 and 4,050,221 are contemplated herein. The disclosures of these patents are incorporated herein in their entirety by reference.

The following demonstrate the extent of the unexpected results obtained with the multilayer stretch wrap films of the present invention. The invention is illustrated by the following non-limiting examples:

EXAMPLES

Utilizing the aforementioned method of extrusion, twelve three-layer (A/B/A) coextrusions were produced, as shown below, to compare film properties. All examples were produced on a production cast line using a die block arrangement that provided a tapered core profile. These films were produced over a mil gauge range of about 0.6 to about 0.8, with melt temperatures of approximately 540°-550° F. for the outer, A, layers and 490°-500° F. for the intermediate, B layer. Film thickness was varied by changing the speed of the extruder. Resins employed in the film structures of Examples 1-12 are summarized in Table 1, below. The properties of the films of Examples 1-12 were determined in accordance with industry recognized procedures. Those properties are compared in Table 2, below.

EXAMPLE 1

The film structure of Example 1 was prepared in accordance with the invention disclosed in U.S. Pat. No. 5,019,315 for the purpose of comparison with the film structure prepared in accordance with the present invention.

EXAMPLE 2

The film structure of Example 2 was prepared to demonstrate that by blending a lower melt index butene-1 LLDPE with the high melt index particularly preferred high melt index hexene-1 LLDPE reduces the ability of the resultant film to resist tearing in the machine direction, when all other variables are held constant.

EXAMPLE 3

A film structure was prepared in accordance with the present invention, to demonstrate that the benefits in resistance to tearing in the machine direction and increase in puncture resistance which accrue therefrom.

EXAMPEL 4

Another film structure was prepared in accordance with the present invention, to demonstrate the effect that varying the thickness of the intermediate layer, relative to the outer layers, has on film properties.

EXAMPLE 5

The film structure of Example 5 was prepared to demonstrate that a butene-1 LLDPE, while having a low melt index as required in the practice of the present invention, is not preferred for use in the core layer due to its effect on lowering machine direction tear resistance.

EXAMPEL 6

Another film structure was prepared in accordance with the present invention, to demonstrate the effect of increasing the melt index of the core layer resin toward the upper end of the preferred range of core layer melt indices. As may be seen by comparison with the properties of the film structure of Example 4, increasing the melt index of the core layer has the effect of lowering machine direction tear resistance.

EXAMPLE 7

Another film structure was prepared in accordance with the present invention, to demonstrate the effect of using an octene-1 LLDPE on film properties. As may be seen by comparison with the film structure of Example 6, the use of an octene-1 LLDPE results in a film of increased puncture resistance, when all other film properties are held constant.

EXAMPLE 8

Another film structure, employing the resins of Example 7, was prepared in accordance with the present invention, to demonstrate the effect that varying the thickness of the intermediate layer, relative to the outer layers, has on film properties.

EXAMPLE 9

A film structure was prepared to demonstrate the effect on resultant film properties of blending a low melt index hexene-1 LLDPE with a high melt index hexene-1 LLDPE to obtain an intermediate layer resin blend having a melt index within the range of values preferred in the practice of the present invention.

EXAMPLE 10

Another film structure, employing the resins of Example 6, was prepared in accordance with the present invention, to demonstrate the effect that varying the thickness of the intermediate layer, relative to the outer layers, has on film properties.

EXAMPLE 11

Another film structure was prepared to demonstrate the effect on film properties of using a high melt index octene-1 LLDPE as an outer layer resin and a low melt index octene-1 LLDPE as an intermediate layer resin. As indicated above, the use of an octene-1 LLDPE as an outer layer resin requires the use of a cling additive to produce the cling functionality required of a stretch wrap film.

EXAMPLE 12

A film structure was prepared to demonstrate that by blending a lower melt index butene-1 LLDPE with a high melt index hexene-1 LLDPE to obtain an intermediate layer resin blend having a melt index within the range of values preferred in the practice of the present invention produces a film having reduced resistance to tearing in the machine direction, consistent with the film of Example 5.

TABLE 1

| Ex. | Layer | Percent of Total Film Thickness | Polyethylene Component | Force Required To Stretch Film To 200% (PSI) Elongation |
|---|---|---|---|---|
| 1 | A | 45.0% | [1]Exxon 3003.37 LLDPE, 0.917 gm/cc, (Hexene) MI = 3.2 | 1,531 |
|   | B | 10.0% | [2]DOW 748 LDPE 0.92 gm/cc, MI = 7.0 Density = 0.919 gm/cc |   |
|   | A | 45.0% | Exxon 3003.37 LLDPE, 0.917 gm/cc, MI = 3.2 |   |
| 2 | A | 45.0% | 80/20 Blend of Exxon 3003.37 LLDPE, Density 0.917 gm/cc, MI = 3.2 and [3]Exxon 1002.37 LLDPE, Density = 0.917 gm/cc, (Butene) MI = 2.0 | 1,540 |
|   | B | 10.0% | DOW 748 LDPE 0.92 gm/cc, MI = 7.0 Density = 0.919 gm/cc, |   |
|   | A | 45.0% | 80/20 Blend of Exxon 3003.37 LLDPE, Density 0.917 gm/cc, MI = 3.2 and Exxon 1002.37 LLDPE, 0.918 gm/cc, MI = 2.0 |   |
| 3 | A | 40.0% | Exxon 3003.37 LLDPE, 0.917 gm/cc MI = 3.2 | 1,480 |
|   | B | 20.0% | [4]Exxon 3001.63 LLDPE, (Hexene) 0.917 gm/cc, MI = 1.0 |   |
|   | A | 40.0% | Exxon 3003.37 LLDPE, 0.917 gm/cc MI = 3.2 |   |
| 4 | A | 35.0% | Exxon 3003.37 LLDPE, 0.917 gm/cc MI = 3.2 | 1,488 |
|   | B | 30.0% | Exxon 3001.63 LLDPE, 0.917 gm/cc MI = 1.0 |   |
|   | A | 35.0% | Exxon 3003.37 LLDPE, 0.917 gm/cc MI = 3.2 |   |
| 5 | A | 40.0% | Exxon 3003.37 LLDPE, 0.917 gm/cc MI = 3.2 | 1,528 |
|   | B | 20.0% | [5]Exxon 1001.37 LLDPE (Butene), 0.918 gm/cc, MI = 1.0 |   |
|   | A | 40.0% | Exxon 3003.37 LLDPE, 0.917 gm/cc MI = 3.2 |   |
| 6 | A | 35.0% | Exxon 3003.37 LLDPE, 0.917 gm/cc MI = 3.2 | 1,533 |
|   | B | 30% | [6]Exxon 3002.37 LLDPE (Hexene), 0.916 gm/cc, MI = 2.0 |   |
|   | A | 35.0% | Exxon 3003.37 LLDPE, 0.917 gm/cc MI = 3.2 |   |
| 7 | A | 35.0% | Exxon 3003.37 LLDPE, 0.917 gm/cc MI = 3.2 | 1,472 |
|   | B | 30.0% | [7]DOW 2047A LLDPE (Octene), 0.917 gm/cc, MI = 2.3 |   |

TABLE 1-continued

| Ex. | Layer | Percent of Total Film Thickness | Polyethylene Component | Force Required To Stretch Film To 200% (PSI) Elongation |
|---|---|---|---|---|
| | A | 35.0% | Exxon 3003.37 LLDPE, 0.917 gm/cc MI = 3.2 | |
| 8 | A | 10.0% | Exxon 3003.37 LLDPE, 0.917 gm/cc MI = 3.2 | 1,545 |
| | B | 80.0% | DOW 2047A LLDPE, 0.917 gm/cc, MI = 2.3 | |
| | A | 10.0% | Exxon 3003.37 LLDPE, 0.917 gm/cc MI = 3.2 | |
| 9 | A | 10.0% | Exxon 3003.37 LLDPE, 0.917 gm/cc, MI = 3.2 | 1,712 |
| | B | 80.0% | 50/50 Blend of Exxon 3003.37 LLDPE, 0.917 gm/cc, MI = 3.2 and Exxon 3001.63 LLDPE, 0.917 gm/cc, MI = 1.0 | |
| | A | 10.0% | Exxon 3003.37 LLDPE, 0.917 gm/cc, MI = 3.2 | |
| 10 | A | 10.0% | Exxon 3003.37 LLDPE, 0.917 gm/cc MI = 3.2 | 1,712 |
| | B | 80.0% | Exxon 3002.37 LLDPE, 0.916 gm/cc, MI = 2.0 | |
| | A | 10.0% | Exxon 3003.37 LLDPE, 0.917 gm/cc MI = 3.2 | |
| 11 | A | 10.0% | [8]DOW .13 LLDPE (Octene) 0.904 gm/cc, MI = 2.3 (With cling agent added) | 1,804 |
| | B | 80.0% | DOW 2047A LLDPE, 0.917 gm/cc, MI = 2.3 | |
| | A | 10.0% | DOW .13 LLDPE 0.904 gm/cc, MI = 2.3 (With cling agent added) | |
| 12 | A | 10.0% | Exxon 3003.37 LLDPE, 0.917 gm/cc MI = 3.2 | 1,565 |
| | B | 80.0% | 40/60 Blend of Exxon 3003.37 LLDPE, 0.917 g/cc, MI = 3.2 and Exxon 1002.37 LLDPE, 0.918 gm/cc, MI = 2.0 (Butene) | |
| | A | 10.0% | Exxon 3003.37 LLDPE, 0.917 gm/cc MI = 3.2 | |

[1]Exxon 3003.37 LLDPE is a hexene-1-based ethylene copolymer.
[2]Dow 748 is a high pressure low density polyethylene.
[3]Exxon 1002.37 LLDPE is a butene-1-based ethylene copolymer.
[4]Exxon 1001.63 is a hexene-1-based ethylene copolymer.
[5]Exxon 1001.37 LLDPE is a butene-1-based ethylene copolymer.
[6]Exxon 3002.37 LLDPE is a hexene-1-based ethylene copolymer.
[7]Dow 2047A LLDPE is an octene-1-based ethylene copolymer.
[8]Dow .13 LLDPE is an octene-1-based ethylene copolymer.

TABLE 2

| Lab Test | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Gauge (mils) | 0.74 | 0.71 | 0.75 | 0.77 | 0.74 | 0.74 | 0.76 | 0.77 | 0.75 | 0.72 | 0.60 | 0.76 |
| Yield (psi) MD | 1,190 | 1,188 | 1,125 | 1,102 | 1,114 | 1,170 | 1,101 | 1,039 | 1,133 | 1,209 | 923 | 1,126 |
| Yield (psi) TD | 1,180 | 1,166 | 1,074 | 1,107 | 1,096 | 1,128 | 1,065 | 1,003 | 1,188 | 1,160 | 872 | 1,126 |
| Ultimate (psi) MD | 5,049 | 4,130 | 4,657 | 4,493 | 5,318 | 5,558 | 5,780 | 5,250 | 6,426 | 6,718 | 6,045 | 5,950 |
| Ultimate (psi) TD | 3,234 | 3,072 | 3,215 | 2,985 | 2,943 | 2,792 | 2,943 | 3,120 | 2,851 | 3,271 | 2,479 | 3,437 |
| Toughness (ft-lb/in3) MD | 950 | 703 | 806 | 760 | 928 | 1,029 | 1,117 | 820 | 1,040 | 1,147 | 762 | 1,141 |
| Toughness (ft-lb/in3) TD | 970 | 946 | 916 | 843 | 862 | 809 | 835 | 819 | 816 | 976 | 637 | 1,114 |
| Elongation (%) MD | 528 | 458 | 486 | 466 | 494 | 517 | 556 | 464 | 473 | 498 | 397 | 536 |
| Elongation (%) TD | 731 | 735 | 698 | 669 | 672 | 663 | 652 | 649 | 665 | 727 | 583 | 786 |
| Tear (gms) MD | 187 | 119 | 228 | 212 | 172 | 189 | 179 | 328 | 389 | 214 | 261 | 159 |
| Tear (gms) TD | 852 | 845 | 767 | 748 | 752 | 809 | 797 | 773 | 887 | 859 | 922 | 794 |
| TEDD (in-lbs)/mil | 10.69 | 10.05 | 16.54 | 12.97 | 13.09 | 13.44 | 14.00 | 13.69 | 11.92 | 15.70 | 18.57 | 11.44 |
| Probe (in-lbs) | 14.65 | 17.60 | 17.89 | 16.67 | 20.43 | 16.40 | 18.37 | 22.64 | 20.37 | 23.26 | 19.88 | 18.20 |

TABLE 2-continued

| Lab Test | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Peel Cling In/Out (g) | 178 | 171 | 187 | 173 | 177 | 170 | 188 | 204 | 182 | 170 | 166 | 182 |
| Unstretched Gloss (%) | 93.2 | 93.1 | 90.1 | 90.5 | 90.1 | 92.8 | 92.2 | 92.2 | 92.0 | 92.1 | 84.2 | 92.3 |
| Unstretched Haze (%) | 1.04 | 0.69 | 1.87 | 1.49 | 2.09 | 1.46 | 1.37 | 1.47 | 1.75 | 1.39 | 1.79 | 1.46 |
| MD Force @ 200% (psi) | 1,531 | 1,540 | 1,480 | 1,488 | 1,528 | 1,533 | 1,472 | 1,545 | 1,712 | 1,722 | 1,804 | 1,565 |

While no cling agent was employed in the manufacture of the films of Examples 1-10 and 12, the films of Examples 1-10 and 12 were found to exhibit good, on-load stretched cling due to the use of the hexene-based LLDPE to form the outer skin layers of the films. The hexene-based LLDPE used is known to possess a relatively high level of n-hexane extractables which is believed to result in good inherent cling. As shown, the force required to stretch the film to 200% elongation was measured to be within the range of about 1470 to about 1800 psi for the films of Examples 1-12.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A thermoplastic stretch wrap film for the overwrap packaging of articles, comprising at least three layers, said three layers having two outer layers and an intermediate layer positioned between said outer layers, said intermediate layer consisting essentially of a low melt index linear low density polymer of ethylene and a minor amount of at least one alpha olefin having from 4 to 10 carbon atoms, said low melt index linear low density copolymer having a melt index of between 0.5 and 2.5 and at least one of said two outer layers consisting essentially of a high melt index linear low density copolymer of ethylene and a minor amount of at least one alpha olefin having from 4 to 10 carbon atoms, said high melt index linear low density copolymer having a melt index of at least 2.8, said high melt index linear low density copolymer containing from about 3.5 to about 15 weight percent n-hexane extractibles, wherein said n-hexane extractibles are present in an amount sufficient to cause the stretch wrap film to exert a cling force when in surface-to-surface contact with itself or another surface when used in the stretch overwrap packaging of articles.

2. A film according to claim 1, wherein each of said two outer layers consists essentially of said linear low density polyethylene.

3. A film according to claim 2, wherein said alpha olefin is present in said low melt index linear low density polyethylene in an amount of about 1 to about 20 weight percent total and is a member selected from the group consisting of butene-1; 3-methyl-butene-1; 3-methyl-pentene-1; 4-methylpentene-1; hexene-1; 3-methyl-hexene-1; octene-1-decene-1 and mixtures thereof.

4. A film according to claim 3, wherein said alpha olefin of said low melt index linear low density polyethylene is a member selected from the group consisting of butene-1, hexene-1, octene--1 and mixtures thereof.

5. A film according to claim 3, wherein said alpha olefin is present in said high melt index linear low density polyethylene in an amount of about 1 to about 20 weight percent total and is a member selected from the group consisting of butene-1; 3-methyl-butene-1; 3-methyl-pentene-1; 4-methylpentene-1; hexene-1; 3-methyl-hexene-1; octene mixtures thereof.

6. A film according to claim 5, wherein said alpha olefin of said high melt index linear low density polyethylene is hexene-1.

7. A film according to claim 6, wherein said high melt index linear low density polyethylene has a density of about 0,890 to 0,940 grams/c.c. and a melt index of about 2.5 to 10.0.

8. A film according to claim 7, wherein said high melt index linear low density polyethylene has a melt index from about 2.5 to 5.0 and a density from about 0.915 to 0,920 grams/c.c. and said alpha olefin is hexene-1.

9. A film according to claim 8, wherein said low melt index linear low density polyethylene has a density of about 0,890 to 0,940 grams/c.c. and a melt index of about 0.2 to 2.5.

10. A film according to claim 9, wherein said low melt index linear low density polyethylene has a density of about 0,915 to 0,920 grams/c.c. and a melt index of about 1.0 to 2.0.

11. A method for preparing a thermoplastic stretch wrap film capable of stretching upon exerting a force during application of the film to an article or group of articles to be wrapped comprising the step of:

coextruding a film having at least three layers, said three layers having two outer layers and an intermediate layer positioned between said outer layers, said intermediate layer comprising a low melt index linear low density copolymer of ethylene and a minor amount of at least one alpha olefin having from 4 to 10 carbon atoms, said low melt index linear low density copolymer having a melt index of between about 0.5 to about 2.5, and at least one of said two outer layers comprising a high melt index linear low density copolymer of ethylene and a minor amount of at least one alpha olefin having from 4 to 10 carbon atoms, said high melt index linear low density copolymer having a melt index of at least 2.8, said high melt index linear low density copolymer containing from about 3.5 to about 15 weight percent n-hexane extractibles, wherein said n--hexane extractibles are present in an amount sufficient to cause the stretch wrap film so coextruded to exert a cling force when in surface-to surface contact with itself or another surface when used in the stretch overwrap packaging of articles.

12. The method of claim 11 wherein said coextruding step is a slot cast extrusion or at blown film extrusion step.

13. The method of claim 12, wherein each of said two outer layers comprises said linear low density polyethylene.

14. The method of claim 13, wherein said alpha olefin is present in said low melt index linear low density polyethylene in an amount of about 1 to about 20 weight percent total and is a member selected from the group consisting of butene-1; 3-methyl-butene--1; 3-methylpentene-1; 4-methyl- pentene-1; hexene-1; 3-methyl-hexene-1; octene-1; decene-1 and mixtures thereof.

15. The method of claim 13, wherein said alpha olefin of said low melt index linear low density polyethylene is a member selected from the group consisting of hexene-1, octene-1 and mixtures thereof.

16. The method of claim 15, wherein said alpha olefin is present in said high melt index linear low density polyethylene in an amount of about 1 to about 20 weight percent total and is a men, her selected from the group consisting of butene-1; 3-methyl-butene-1; 3-methyl-pentene-1; 4-methyl pentene-1; hexene-1; 3-methyl-hexene-1; octene-1; decene-1 and mixtures thereof.

17. The method of claim 16, wherein said alpha olefin of said high melt index linear low density polyethylene is hexene-1.

18. The method of claim 17, wherein said high melt index linear low density polyethylene has a melt index from about 2.8 to 5.0 and a density from about 0,915 to 0.920 grams/c.c. and said alpha olefin is hexene-1.

19. A unitized plurality of goods comprising:
a plurality of goods having a polyethylene stretch wrap film layer on about the girth of said goods in stretched condition, the end region of said film being attached to a previous layer of said film;
said polyethylene stretch wrap film comprising at least three layers, said three layers having two outer layers and an intermediate layer positioned between said outer layers, said intermediate layer comprising a low melt index linear low density copolymer of ethylene and a minor amount of at least one alpha olefin having from 4 to 10 carbon atoms said low melt index linear low density copolymer having a melt index of between about 0.5 to about 2.5, and at least one of said two outer layers comprising a high melt index linear low density copolymer of ethylene and a minor amount of at least one alpha olefin having from 4 to 10 carbon atoms, said high melt index linear low density copolymer having a melt index of at least 2.8, said high melt index linear low density copolymer containing from about 3.5 to about 15 weight percent n-hexane extractibles wherein said n-hexane extractibles are present in an amount sufficient to cause the stretch wrap film to exert a cling force when in surface-to-surface contact with itself.

20. The unitized goods of claim 19, wherein said unitized goods is a unitized pallet load.

21. In a thermoplastic stretch wrap film for the overwrap packaging of articles, comprising at least three polyolefin layers, said three layers having two outer layers and an intermediate layer; the improvement which comprises:
said intermediate layer consisting essentially of low melt index linear low density copolymer of ethylene and a minor amount of at least one alpha olefin having from 4 to 10 carbon atoms, said low melt index linear low density copolymer having a melt index of between 0.5 and 2.5 and;
at least one of said two outer layers consisting essentially of a high melt index linear low density copolymer of ethylene and a minor amount of at least one alpha olefin having from 4 to 10 carbon atoms, said high melt index linear low density copolymer having a melt index of at least 2.8, said high melt index linear low density copolymer containing from about 3.5 to about 15 weight percent n-hexane extractibles, said n-hexane extractibles present in an amount sufficient to cause the stretch wrap film to exert a cling force when in surface-to-surface contact with itself or another surface when used in the stretch overwrap packaging of articles;
said intermediate layer having a thickness of at least 80 percent of total layer thickness whereby the wrap film has improved puncture and tear resistance.

22. A film according to claim 21 wherein
each of said outer layers consists essentially of said linear low density polyethylene.

23. A film according to claim 21 wherein
said outer layer has a melt index of 2.8 to 5; and
said intermediate layer has a melt index not greater than 2.0.

24. A film according to claim 21 wherein
said intermediate layer consists essentially of a copolymer of ethylene and octene-1.

* * * * *

UNITED STATES PATENT AND TRADEMARK OFFICE
CERTIFICATE OF CORRECTION

PATENT NO. : 5,334,428
DATED : August 2, 1994
INVENTOR(S) : David V. Dobreski et al It is certified that error appears in the above-indentified patent and that said Letters Patent is hereby corrected as shown below:

Col. 15, line 33 (claim 1), "polymer" should read --copolymer--.

Col. 15, line 59 (claim 3), "octene-1-decene-1" should read --octene-1;decene-1--.

Col. 16, line 12 (claim 5), change "octene" to --octene-1-- and insert --; decene-1 and--.

Col. 16, line 18 (claim 7), "0,890 to 0,940" should read --0.890 to 0.940--.

Col. 16, line 22 (claim 8), "2.5" should read --2.8--.

Col. 16, line 23 (claim 8), "0,920" should read --0.920--

Col. 16, line 26 (claim 9), "0,890 to 0,940" should read --0.890 to 0.940--.

Col. 16, line 30, claim 10, "0,915 to 0,920" should read --0.915 to 0.920--.

UNITED STATES PATENT AND TRADEMARK OFFICE
CERTIFICATE OF CORRECTION

PATENT NO. : 5,334,428
DATED : August 2, 1994
INVENTOR(S) : David V. Dobreski et al It is certified that error appears in the above-indentified patent and that said Letters Patent is hereby corrected as shown below:

Col. 17, line 10, claim 16, "men,her" should read --member--.

Signed and Sealed this

Eighth Day of November, 1994

Attest:

BRUCE LEHMAN

Attesting Officer

Commissioner of Patents and Trademarks